3,379,500
PROCESS FOR THE CATALYTIC PRODUCTION OF HYDROCYANIC ACID
Francesco Albanese, Enrico Padula, and Massimo Principi, Mestre, Venezia, Italy, assignors to Montecatini-Edison S.p.A., Milan, Italy
Filed Apr. 12, 1966, Ser. No. 542,045
Claims priority, application Italy, Apr. 14, 1965, 8,265/65
2 Claims. (Cl. 23—151)

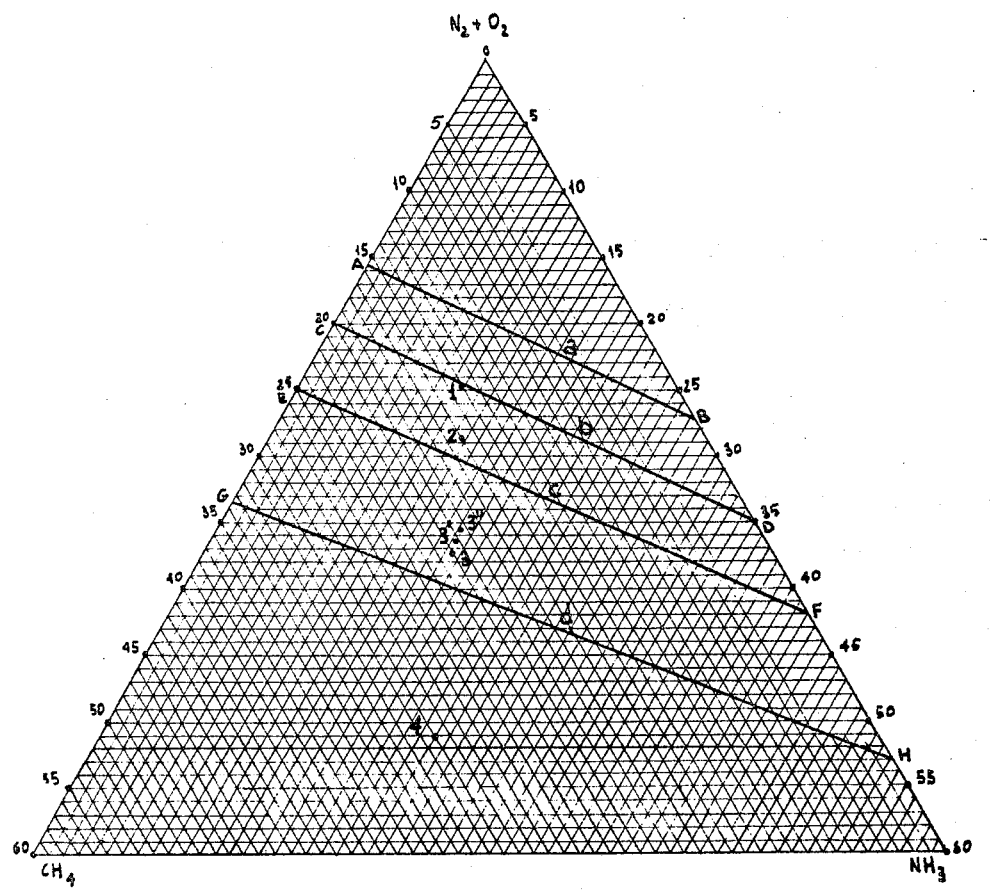

ABSTRACT OF THE DISCLOSURE

A method for the preparation of hydrocyanic acid in good yield and with high conversions, which comprises passing a gaseous mixture comprising of ammonia, methane, nitrogen and oxygen over nets of a catalyst selected from the group consisting of metals of the platinum group and alloys based upon such metals, at temperatures ranging from between about 1100° C. and 1200° C., with the molar ratios of the respective components of the gaseous mixture being as follows:

$$\frac{O_2}{O_2+N_2} \text{ from } 0.270 \text{ to } 0.317;$$

$$\frac{O_2+N_2}{NH_3} \text{ from } 4.8 \text{ to } 3.65;$$

$$\frac{O_2+N_2}{CH_4} \text{ from } 4.55 \text{ to } 2.00;$$

$$\frac{CH_4}{NH_3} \text{ from } 1.4 \text{ to } 1.05.$$

---

The present invention relates to a process for the preparation of hydrocyanic acid. More particularly, it relates to a process for the preparation of hydrocyanic acid via reaction in gaseous phase and at elevated temperatures of a mixture of ammonia, methane, nitrogen, and oxygen in the presence of a catalyst, such as metallic platinum or its alloys. Even more particularly, the present invention relates to improvements in the basic process for carrying out this catalytic reaction when particular ratios of components of the gaseous mixture are used.

The industrial synthesis of HCN from ammonia, methane and air is well known. The heat necessary for the endothermic reaction:

$$NH_3+CH_4 \rightarrow HCN+3H_2$$

is afforded by the contemporaneous combustion of oxygen and methane. Generally the process is carried out in the presence of catalysts, at temperatures ranging from 900° to 1200° C. and with large quantities of air. The gases which leave the catalytic zone contain not only HCN, but also carbon monoxide, hydrogen, steam, nitrogen and carbon dioxide, as well as unreacted methane and ammonia, and in such manner that the HCN produced is very diluted, giving rise to many technical processing difficulties during the separation stages.

Similar difficulties are encountered when operating according to some of the known processes, with very large quantities of methane in comparison with the quantity of ammonia.

The conversions and the yields of HCN realized by conducting the process according to the prior art methods are not very high, which, together with the drawback of dilution of the resultant HCN, makes their employment not very advantageous.

According to other known processes, the reacting gases are subjecting to a preliminary heating at high temperatures, which permits the reaction to proceed in the presence of relatively small quantities of air, thereby achieving higher concentrations of HCN in the outlet gases. However, carrying out a preheating stage at high temperatures brings about many complications. In fact, the use of preheaters operating at high temperatures is quite burdensome and, furthermore, the relatively low temperature of decomposition of ammonia requires that it be preheated separately, which further complicates the technology of the process.

Therefore, the principal object of the present invention is that of providing an improved process for the production of HCN; a further object of the present invention is that of providing a process for the production of HCN from ammonia, methane, oxygen and nitrogen, and characterized by high conversions and yields.

Among the many advantages realized by the present process for the production of hydrocyanic acid there may be mentioned the high concentration of HCN in the gases of reaction coming from the reactor, which permits a remarkable increase in plant potential with the plant size remaining the same, a reduction in the consumption of energy per kg. of produced HCN, as well as the realization, after absorption, of HCN and unreacted ammonia, of a combustible air/gas mixture of greater heating value.

This advantage, coupled with the high yields and conversions, makes the process of the present invention particularly interesting from an industrial point of view.

Still another advantage is that the HCN can be produced industrially quite readily and without concomitant increase in plant facilities.

The above-mentioned objects and advantages are realized according to the process of the present invention by passing a mixture of ammonia, methane, nitrogen and oxygen over a platinum metals group and their alloys catalyst preferably in the form of nets at a temperature in the range of from 1100 to 1200° C., and by operating with a gaseous mixture having a composition corresponding to the molar ratios comprised in the range defined by the following values:

$$\frac{O_2}{O_2+N_2} > 0.21 \text{ up to } 0.40$$

$$\frac{O_2+N_2}{NH_3} \text{ from } 6.8 \text{ to } 2$$

$$\frac{O_2+N_2}{CH_4} \text{ from } 6.5 \text{ to } 1.55$$

$$\frac{CH_4}{NH_3} \text{ from } 1.4 \text{ to } 1.05$$

In fact, it was surprisingly found, even when operating with smaller quantities of oxygen and/or of methane with respect to the ammonia, that when a mixture of oxygen and nitrogen, wherein the ratio $$O_2/O_2+N_2$$

had a value higher than that of the air was used, together with ammonia and methane suitably admixed therewith the same as in a composition comprised within the above defined range, it was possible to obtain not only a very high concentration of HCN in the outlet gases, but also a considerable increase in conversions and yields.

All the compositions comprised in the above-mentioned ranges are useful for obtaining good yields and conversions and high concentrations of HCN in the outlet gases.

Particularly good results were obtained by operating in the range defined by the following molar ratios:

$$\frac{O_2}{O_2+N_2} \text{ from 0.270 to 0.317}$$

$$\frac{O_2+N_2}{NH_3} \text{ from 4.8 to 3.65}$$

$$\frac{O_2+N_2}{CH_4} \text{ from 4.55 to 2.80}$$

$$\frac{CH_4}{NH_3} \text{ from 1.3 to 1.1}$$

As regards the catalyst particularly good results were obtained by operating in the presence of nets of platinum and its alloys, for ex. nets of platinum-rhodium alloys. The process for producing HCN according to the present invention can be carried out with minimal problems of a technological nature by addition either to the feeding line of the air or to the mixture going to the reactor of a minor amount of pure oxygen (8–10% in volume with respect to the total mixture). Furthermore, it can be applied industrially because it permits of operation within the above described ranges of molar ratios, under conditions of greatest safety, insofar as inflammability of the gaseous mixture is concerned.

In the drawing is illustrated the upper part of an experimental ternary diagram, whose vertices represent, respectively, the mixture of nitrogen+oxygen, the methane and the ammonia, with the points placed on the legs of the triangle representing the binary mixtures, and those placed inside the area of the triangle representing the ternary mixtures. On such a diagram there are considered gaseous mixtures with different values for the molar ratio $$O_2/O_2+N_2$$

If one considers the mixture of ammonia, methane and nitrogen and oxygen, where the molar ratio $$O_2/O_2+N_2$$

is equal to 21% (air), then the corresponding line of the points of inflammability at room temperature is line $a$, passing through points A and B; and the area defined below this line represents the zone of non-inflammability. Given, for example, a mixture of the composition represented by point 1 (comprised in the known ranges for industrial utilization of the process for the production of HCN from $NH_3$, $CH_4$ and air), and corresponding to the following percentages by volume: $NH_3$: 10.7%—$CH_4$: 14%—air 75.3%, then the distance of this point from line $a$ is such that the critical variations of the single mass flows necessary to bring the corresponding mixtures to conditions of inflammability correspond to about +37 for the air, −37% for the methane and −100% for ammonia.

The lines of the points of inflammability corresponding to the mixtures of ammonia, methane, nitrogen and oxygen, wherein the ratio $O_2/(O_2+N_2)$ is equal respectively to 24.5, to 30% and to 40% by volume, are represented in the diagram by lines $b$, $c$, and $d$, passing through points CD, EF and GH. Mixtures represented by points 2, 3, 3′, 3″, 4 and lying in the ranges corresponding to Examples No. 2, 3, 4, 5, 6, 7 infra, are substantially as resistant to inflammability as are those of point 1.

In particular, working with the mixture of the composition represented by point 3 ($NH_3$ 16.1%—$CH_4$ 21%—$O_2$ 18.8% $N_2$ 44.1%), the critical variations of the single mass flows necessary to attain conditions of explosiveness, when methane, ammonia, air and pure oxygen are used, correspond to approximately the following values: +40% for the enriched air, −41% for methane, −94% for ammonia and +90% for pure oxygen.

It thus turns out that the advantages obtained by the process for producing HCN according to the present invention, and in particular the high yields and conversions and the high concentrations of HCN, are effected in conditions no more dangerous than those of known processes, which do not afford the same advantages, thus making the above-described process quite attractive from an industrial point of view.

Furthermore, the safety of the process of the present invention is assured by the fact that the process is preferably carried out with linear velocities of gases on the catalyst nets equal to or greater than 2.5 m./sec., and very higher, therefore, than the rate of flame propagation of the gaseous mixtures under consideration.

To illustrate further the present invention and the advantages thereof, the following specific examples are given, it being understood that these are merely illustrative and not limitative.

Examples 1–7

7 gaseous mixtures containing $NH_3$, $CH_4$, air and $O_2$ were converted into HCN in the presence of 8 nets of 90% by weight platinum, and of 10% rhodium, having a weft corresponding to 80 mesh, and a thread thickness of 0.003 inch.

The feeding temperature of the gases to the reactor was 110° C., and that of the catalyst was from 1120–1150° C. The linear velocity of the gases on the nets was 2.7 m./sec.

The following results were obtained:

| No. of tests | Percentage of gases in the feeding mixture percent vol. | | | | Ratio of the mass flows of gases by volume | | | | Concentration of HCN by weight in the outlet gases of the reactor, percent by wt. | Conversion of $NH_3$ into HCN, percent | Yield calculated on converted $NH_3$, percent |
|---|---|---|---|---|---|---|---|---|---|---|---|
| | $N_2$ | $NH_3$ | $CH_4$ | $O_2$ | $O_2/O_2+N_2$ | $N_2+O_2/NH_3$ | $N_2+O_2/CH_4$ | $CH_4/NH_3$ | | | |
| 1 | 59.5 | 10.7 | 14 | 15.8 | 0.21 | 7 | 5.4 | 1.3 | 7.5 | 68 | 80 |
| 2 | 54.0 | 12.4 | 16.0 | 17.6 | 0.245 | 5.78 | 4.47 | 1.3 | 9.2 | 70 | 82 |
| 3 | 44.1 | 16.1 | 21 | 18.8 | 0.30 | 3.9 | 3 | 1.3 | 12.6 | 70 | 82 |
| 4 | 44.6 | 16.2 | 20.2 | 19 | 0.30 | 3.9 | 3.15 | 1.25 | 13.0 | 72 | 85 |
| 5 | 45.0 | 16.3 | 19.5 | 19.2 | 0.30 | 3.9 | 3.25 | 1.2 | 13.8 | 76 | 91 |
| 6 | 45.6 | 16.3 | 18.7 | 19.5 | 0.30 | 4.0 | 3.50 | 1.15 | 13.5 | 75 | 92 |
| 7 | 29.4 | 22.0 | 29.0 | 19.6 | 0.40 | 2.23 | 1.69 | 1.32 | 17.1 | 65 | 75 |

As is readily apparent, the tests corresponding to Examples Nos. 2, 3, 4, 5, 6 and 7, the mixtures of which are according to the present invention, afford greater conversions and yields, as well as much greater concentrations of HCN than those obtained in the test corresponding to Example No. 1, which is conducted with mixtures of conventional composition.

As many apparently widely different embodiments of this invention may be made without departing from the spirit and scope thereof, it is to be understood that the same is not to be limited to the specific embodiments thereof, except as claimed in the appended claims. Thus, for example, instead of methane, we can use gaseous mixtures containing at least 90% of $CH_4$, in particular natural gas.

What is claimed is:

1. A method for the preparation of hydrocyanic acid in good yield and with high conversions, which comprises passing a gaseous mixture comprised of ammonia, methane, nitrogen and oxygen over nets of a catalyst selected from the group consisting of metals of the platinum group and alloys based upon such metals, at temperatures ranging from between about 1100° C. and 1200° C., with the molar ratios of the respective components of the gaseous mixture being as follows:

$\dfrac{O_2}{O_2+N_2}$ from 0.270 to 0.317;

$\dfrac{O_2+N_2}{NH_3}$ from 4.8 to 3.65;

$\dfrac{O_2+N_2}{CH_4}$ from 4.55 to 2.80;

$\dfrac{CH_4}{NH_3}$ from 1.4 to 1.05

2. The method as defined by claim 1, wherein the catalyst is platinum-rhodium.

References Cited

UNITED STATES PATENTS 1,934,838  11/1933  Andrussow _____ 23—151

EARL C. THOMAS, *Primary Examiner.*

MILTON WEISSMAN, *Examiner.*

H. S. MILLER, *Assistant Examiner.*